US010021226B2

(12) United States Patent
Gagne-Keats et al.

(10) Patent No.: US 10,021,226 B2
(45) Date of Patent: Jul. 10, 2018

(54) DISPLAY COVER MOUNTING

(71) Applicant: Essential Products, Inc., Palo Alto, CA (US)

(72) Inventors: Jason Sean Gagne-Keats, Cupertino, CA (US); Matthew Hershenson, Los Altos, CA (US); Xinrui Jiang, San Jose, CA (US); Xiaoyu Miao, Palo Alto, CA (US); Andrew E. Rubin, Los Altos, CA (US); Joseph Anthony Tate, San Jose, CA (US); David John Evans, V, Palo Alto, CA (US); Rebecca Schultz Zavin, Portola Valley, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/411,397

(22) Filed: Jan. 20, 2017

(65) Prior Publication Data

US 2017/0251086 A1    Aug. 31, 2017

Related U.S. Application Data

(60) Provisional application No. 62/339,050, filed on May 19, 2016, provisional application No. 62/300,631, filed on Feb. 26, 2016.

(51) Int. Cl.
| | | |
|---|---|---|
| *H04B 1/00* | (2006.01) | |
| *H04M 1/02* | (2006.01) | |
| *B22F 3/10* | (2006.01) | |
| *B22F 3/22* | (2006.01) | |
| *B22F 3/24* | (2006.01) | |

(Continued)

(52) U.S. Cl.
CPC ......... *H04M 1/0266* (2013.01); *B22F 3/1021* (2013.01); *B22F 3/225* (2013.01); *B22F 3/24* (2013.01); *B22F 5/00* (2013.01); *C09J 5/04* (2013.01); *C09J 131/04* (2013.01); *C09J 133/00* (2013.01); *C09J 163/00* (2013.01);
(Continued)

(58) Field of Classification Search
CPC .. H04M 2250/22; H04M 1/0266; H04M 1/03; H04M 1/026; H04B 1/3888; G06F 1/1656
USPC .................. 455/566, 575.1, 575.8
See application file for complete search history.

(56) References Cited

U.S. PATENT DOCUMENTS

| | | |
|---|---|---|
| 9,529,389 B1 | 12/2016 | Peters et al. |
| 2008/0156057 A1 | 7/2008 | Lin et al. |

(Continued)

FOREIGN PATENT DOCUMENTS

KR     100749395 B1    8/2007

OTHER PUBLICATIONS

Advisory Action dated Jun. 22, 2017, for U.S. Appl. No. 15/157,335 of Gagne-Keats et al., filed May 17, 2016.
(Continued)

*Primary Examiner* — Ping Hsieh
(74) *Attorney, Agent, or Firm* — Perkins Coie LLP

(57) ABSTRACT

Techniques are described for mounting a display and/or display cover to a housing of a display device, such as a mobile phone. In an embodiment, the housing and display cover include chamfered edges at complementary angles to allow for an "edge-to-edge" display. The display cover and housing are affixed to each other at the chamfered edges using curable liquid adhesive.

21 Claims, 12 Drawing Sheets

(51) Int. Cl.
  *B22F 5/00*   (2006.01)
  *C09J 5/04*   (2006.01)
  *C09J 131/04*  (2006.01)
  *C09J 163/00*  (2006.01)
  *C09J 183/00*  (2006.01)
  *C09J 133/00*  (2006.01)
  *C09J 175/04*  (2006.01)

(52) U.S. Cl.
  CPC ........... *C09J 175/04* (2013.01); *C09J 183/00* (2013.01); *B22F 2998/10* (2013.01); *H04M 2250/22* (2013.01)

(56) References Cited

U.S. PATENT DOCUMENTS

| | | | |
|---|---|---|---|
| 2009/0231960 A1 | 9/2009 | Hutcheson et al. | |
| 2010/0061039 A1 | 3/2010 | Sanford et al. | |
| 2013/0210504 A1* | 8/2013 | Mareno | H04M 1/026 455/575.8 |
| 2013/0329460 A1* | 12/2013 | Mathew | H05K 5/02 362/612 |
| 2014/0077426 A1 | 3/2014 | Park et al. | |
| 2014/0118204 A1 | 5/2014 | Gavilan et al. | |
| 2014/0160367 A1* | 6/2014 | Huang | G06F 1/1643 349/12 |
| 2014/0352926 A1 | 12/2014 | Chin et al. | |
| 2015/0042218 A1* | 2/2015 | Mevatne | H05K 5/062 312/223.1 |
| 2015/0106640 A1 | 4/2015 | Brackman et al. | |
| 2015/0254485 A1* | 9/2015 | Feng | H04M 1/0202 455/556.1 |
| 2016/0110004 A1* | 4/2016 | Huston | G06F 1/1637 345/173 |
| 2016/0342231 A1* | 11/2016 | Ai | G06F 3/041 |

OTHER PUBLICATIONS

U.S. Appl. No. 15/157,335 of Gagne-Keats et al., filed May 17, 2016.
Final Office Action dated Mar. 17, 2017 in U.S. Appl. No. 15/157,335 of Gagne-Keats et al., filed May 17, 2016, 11 pages.
International Search Report and Written Opinion for PCT/US17/18847 dated May 11, 2017, 8 pages.
International Search Report and Written Opinion for PCT/US17/18943 dated Apr. 20, 2017, 13 pages.
Non-Final Office Action dated Dec. 22, 2016 in U.S. Appl. No. 15/157,335 of Gagne-Keats et al., filed May 17, 2016, 7 pages.

* cited by examiner

DISPLAY COVER MOUNTING

CROSS REFERENCE TO RELATED APPLICATIONS

This application claims the benefit of U.S. Provisional Patent Application No. 62/339,050, filed May 19, 2016 and U.S. Provisional Patent Application No. 62/300,631, filed Feb. 26, 2016, each of which are incorporated by reference herein in their entirety.

TECHNICAL FIELD

Various embodiments relate to user devices with displays. More specifically, the disclosed embodiments relate to techniques for mounting displays and/or display covers to the user devices.

BACKGROUND

Many types of electronic devices utilize a graphical user interface that is viewable via a display, such as a liquid crystal display. A user typically interacts with the graphical user interface using an input device that is mechanically actuated (e.g., by buttons or keys) or electronically activated (e.g., using a touch-sensitive screen). The user may view content, such as text and graphics, on the display, and interact with the content using the input device. For instance, a user can issue a command, make a selection, or move a cursor within the bounds of the user interface. Touch-sensitive displays are becoming an increasingly popular option for many electronic devices due to the improved marketability and ease of use of such displays. Increasingly, efforts have been made towards developing a so called "edge-to-edge" or "edgeless" display to maximize the viewable display area for any given electronic device. However, existing techniques for mounting displays and display covers do not allow for this.

SUMMARY

Various techniques for mounting a display cover to a display device housing using chamfered edges are described herein. In an embodiment, a display device, for example a mobile phone, includes a housing that includes a bottom wall and side walls that, along with the bottom wall, form an interior space of the housing. The housing further includes an opening opposite the bottom wall and defined by a top edge of the side walls. The top edge of the side walls include a chamfered edge. The display device further includes a display cover including a panel of transparent material, also with chamfered edges. The chamfered edges of the side wall of the housing and the chamfered edges of the display cover are configured to correspond, such that display cover can be affixed to the housing by a layer of curable liquid adhesive between adjoining faces of the chamfered edges. When affixed to the housing, the display cover can enclose the interior space of the housing and protect an active display assembly disposed within the interior space.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

From the foregoing, it will be appreciated that specific embodiments of the invention have been described herein for purposes of illustration, but that various modifications may be made without deviating from the scope of the invention. Accordingly, the invention is not limited except as by the appended claims.

Overview

Techniques are described herein for mounting a display or display cover to a display device using chamfered edges. As will be described in more detail, using chamfered edges to mount the display or display cover can minimize the bezel around the viewable area of the display allowing for an effectively "edge-to-edge" display. As used herein the term "display device" can include any device that includes a display, for example a mobile phone, tablet device, laptop computer, computer monitor, television, etc.

Figure 1A:
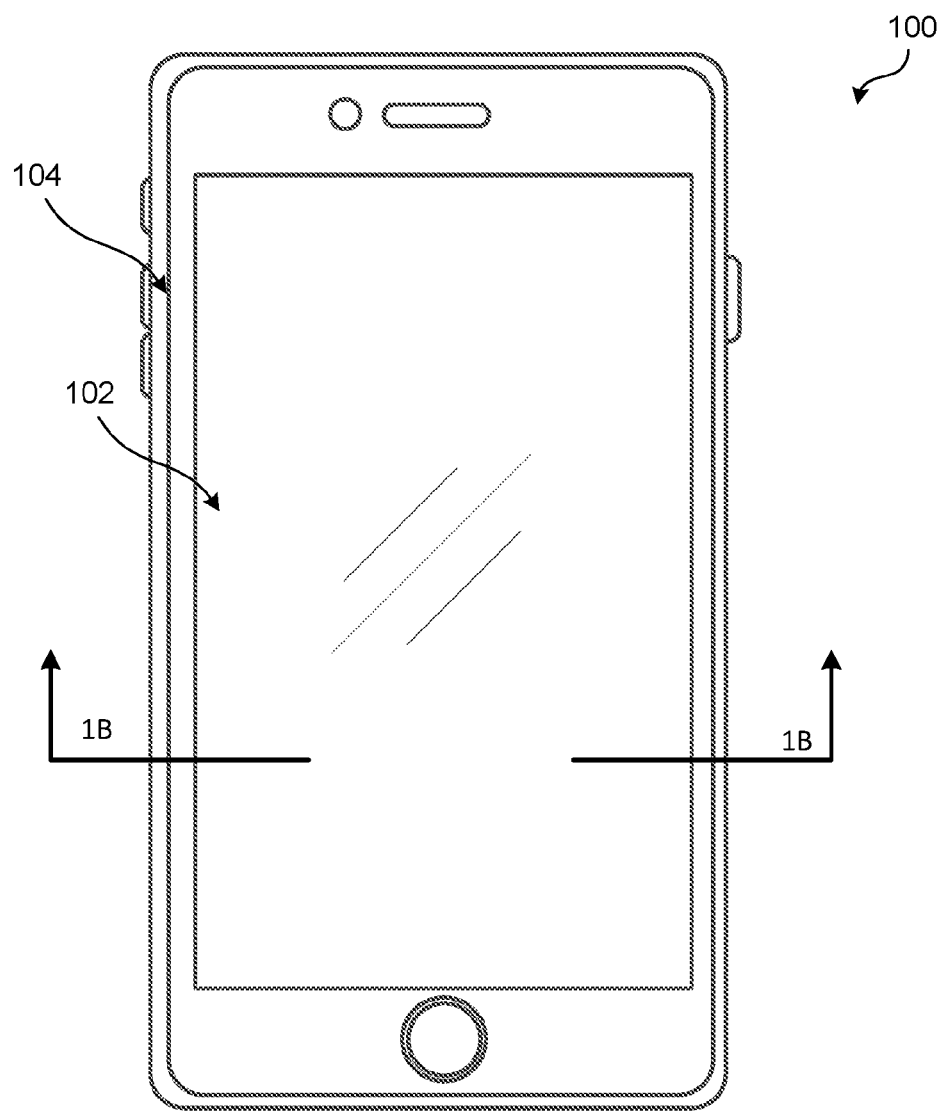
FIG. 1A shows a top view of example display device that includes a display cover mounted to a housing using a standard technique.
Figure 1B:
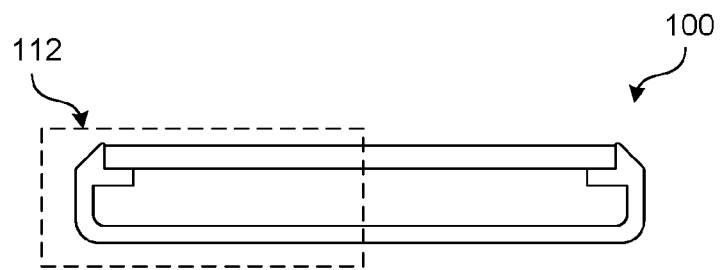
FIG. 1B shows a cross section view of the display device of FIG. 1A.
Figure 1C:
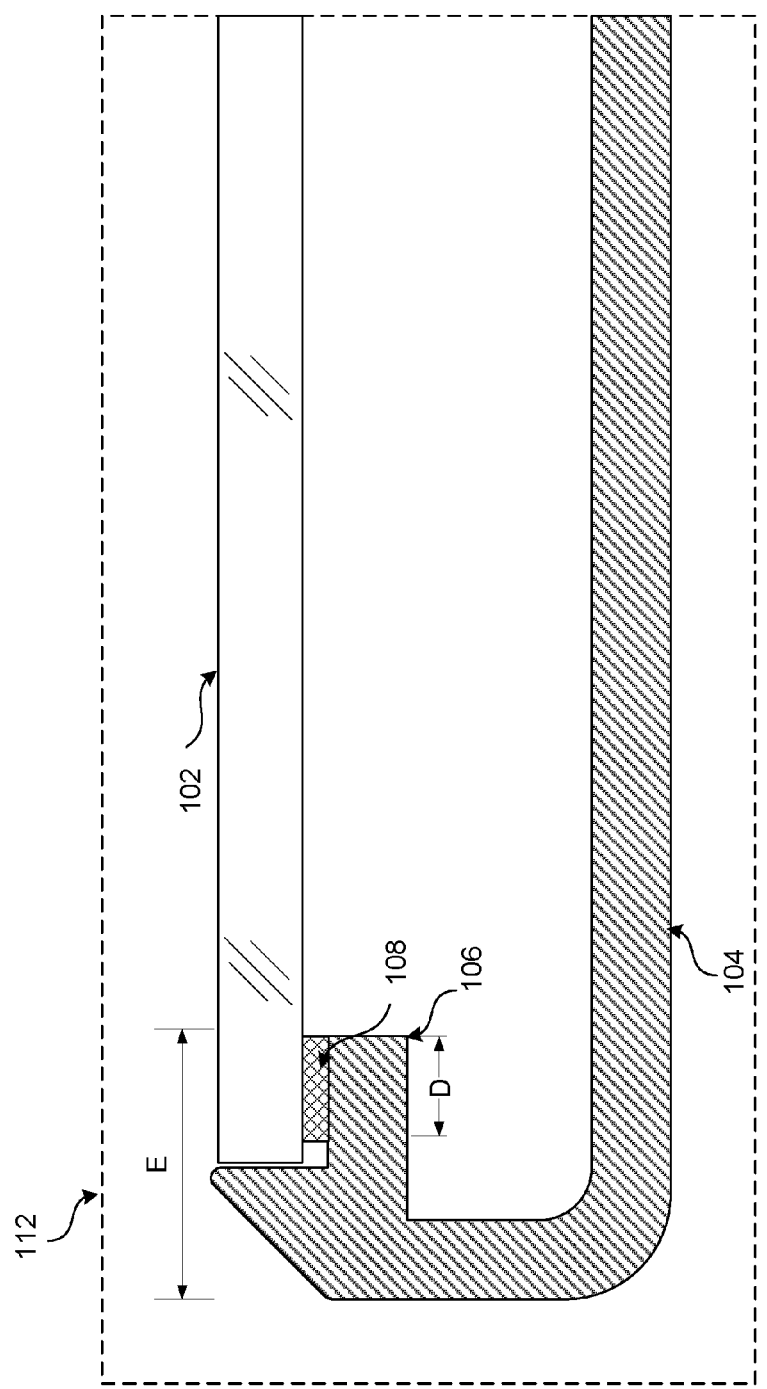
FIG. 1C is a detail of the cross section shown in FIG. 1B.

Currently available display devices use a standard technique for mounting a display or display cover to a device housing that involves adhering the outside edge of the underside of the display or display cover to a flat surface on the display housing using adhesive tape. FIGS. 1A-1C illustrate this standard technique. As will be described, this standard technique leads to a noticeable bezel around the viewable area of the display, which reduces the viewable area of the display relative to the overall size of the device. FIG. 1A shows a top view of example display device 100 that includes a display cover 102 mounted to a housing 104 surrounding the display using a standard technique. FIG. 1B shows a cross section view of the display device 100 shown in FIG. 1A as indicated by the cross section arrows labeled 1B. FIG. 1C is a detail of the cross section shown in FIG. 1B as indicated by the dotted line box 112.

As shown in FIG. 1C, to provide for a flat surface on which to mount the display cover 102, housing 104 includes an ledge 106 that runs around at least a portion of a front opening of the housing 104. The display cover 102 is then affixed to the housing 104 using an adhesive tape 108 that affixes to an outside edge of the underside of the display cover 102. The specific dimensions required will vary depending on the particular device, but generally stated, adhesive tape 108 must have some minimum width D to provide for sufficient contact area between the display cover 102 and housing 104 needed to hold the display cover in place. For example, in the case of touch screen mobile phone, this width D must usually be greater than 1 mm. Further as shown in FIG. 1C, the width D of the tape on the underside along with the width of the side wall of housing 104 leads to an overall bezel width E that is usually at least 2-3 mm in total. That is to say, when viewed by a user, display device 100 as shown in FIG. 1A-1C includes a frame that is at least 2-3 mm on all sides. This of course goes up as the size of the display device 100 increases, for example in the case of a tablet device or computer monitor. As the trend continues towards minimizing the bezel around an active viewable area for display devices, this standard mounting technique runs into the technical limitation of the required width of the tape meaning that a true edge-to-edge display is not possible.

To address this problem, techniques are described herein for mounting a display or display cover to a display device housing using chamfered edges such that the components contact at angled surfaces. Angling the contact surfaces can minimize the bezel width while providing sufficient contact area over which to apply an adhesive.

Display Mounting Using Chamfered Edges

Figure 2A:
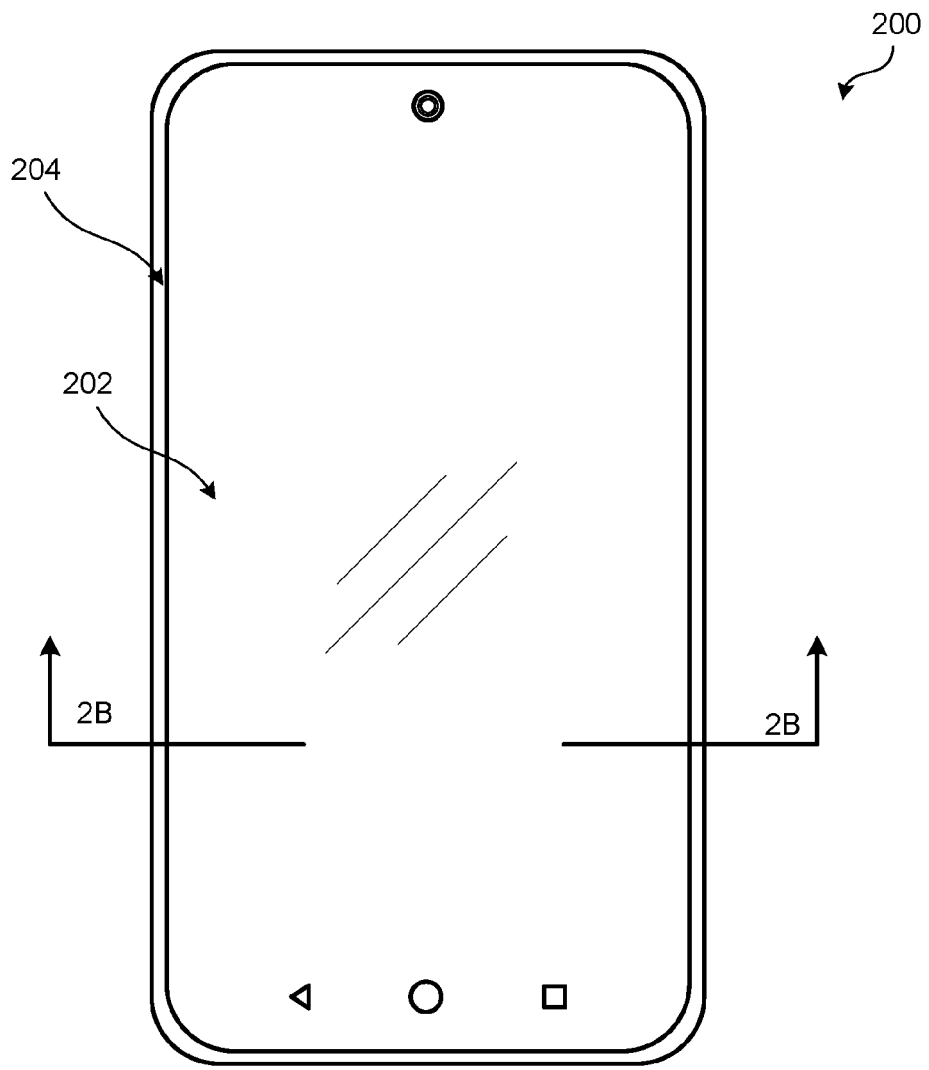
FIG. 2A shows a top view of example display device that includes a display cover mounted to a housing using chamfered edges.
Figure 2B:
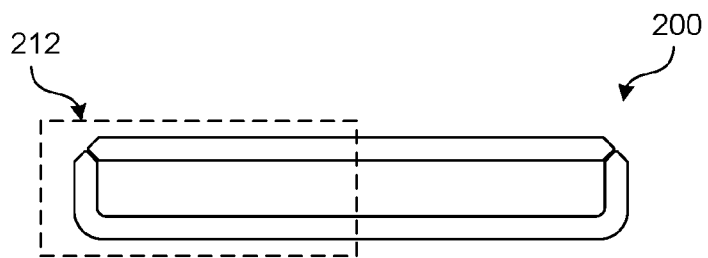
FIG. 2B shows a cross section view of the display device of FIG. 2A.
Figure 2C:
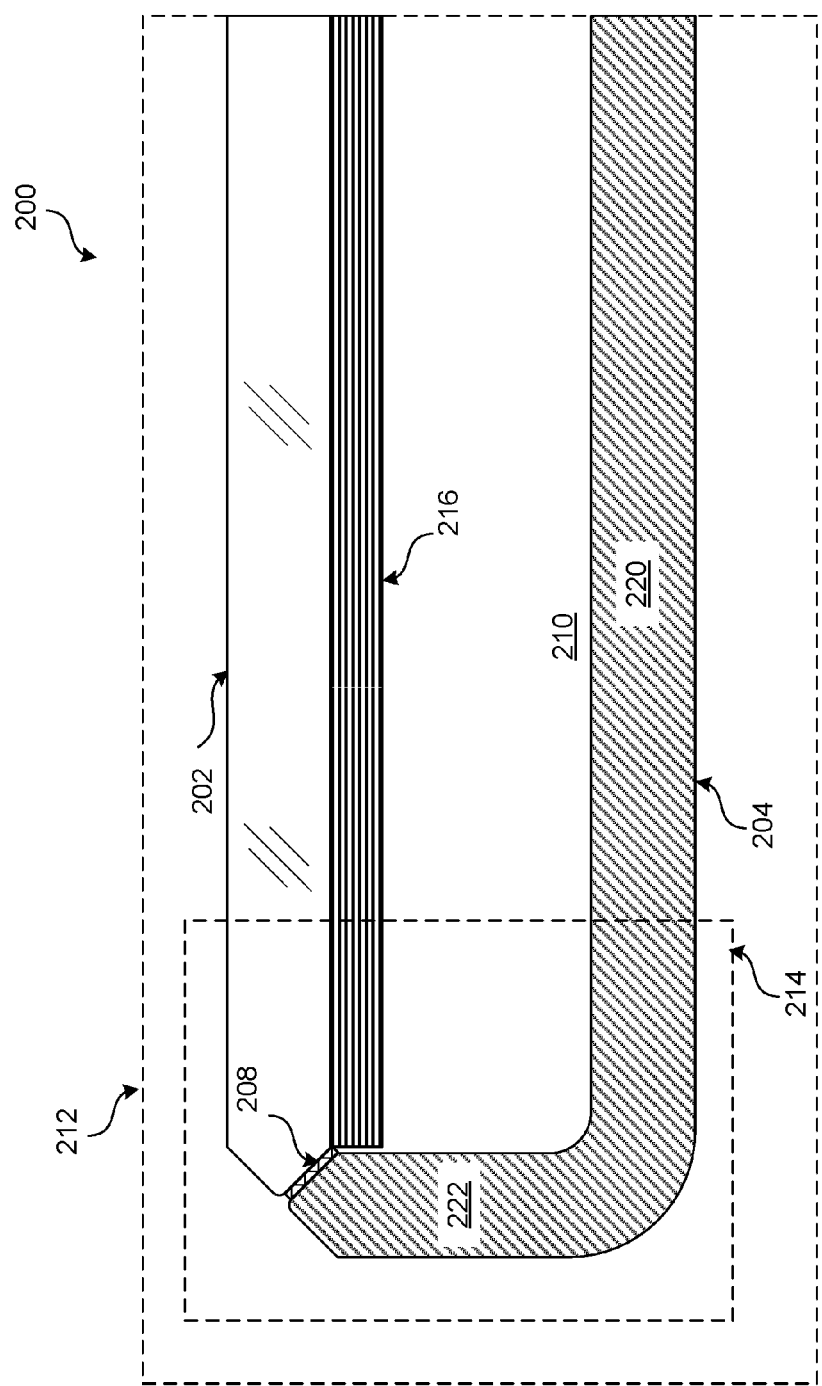
FIG. 2C is a detail of the cross section shown in FIG. 2B.
Figure 2D:
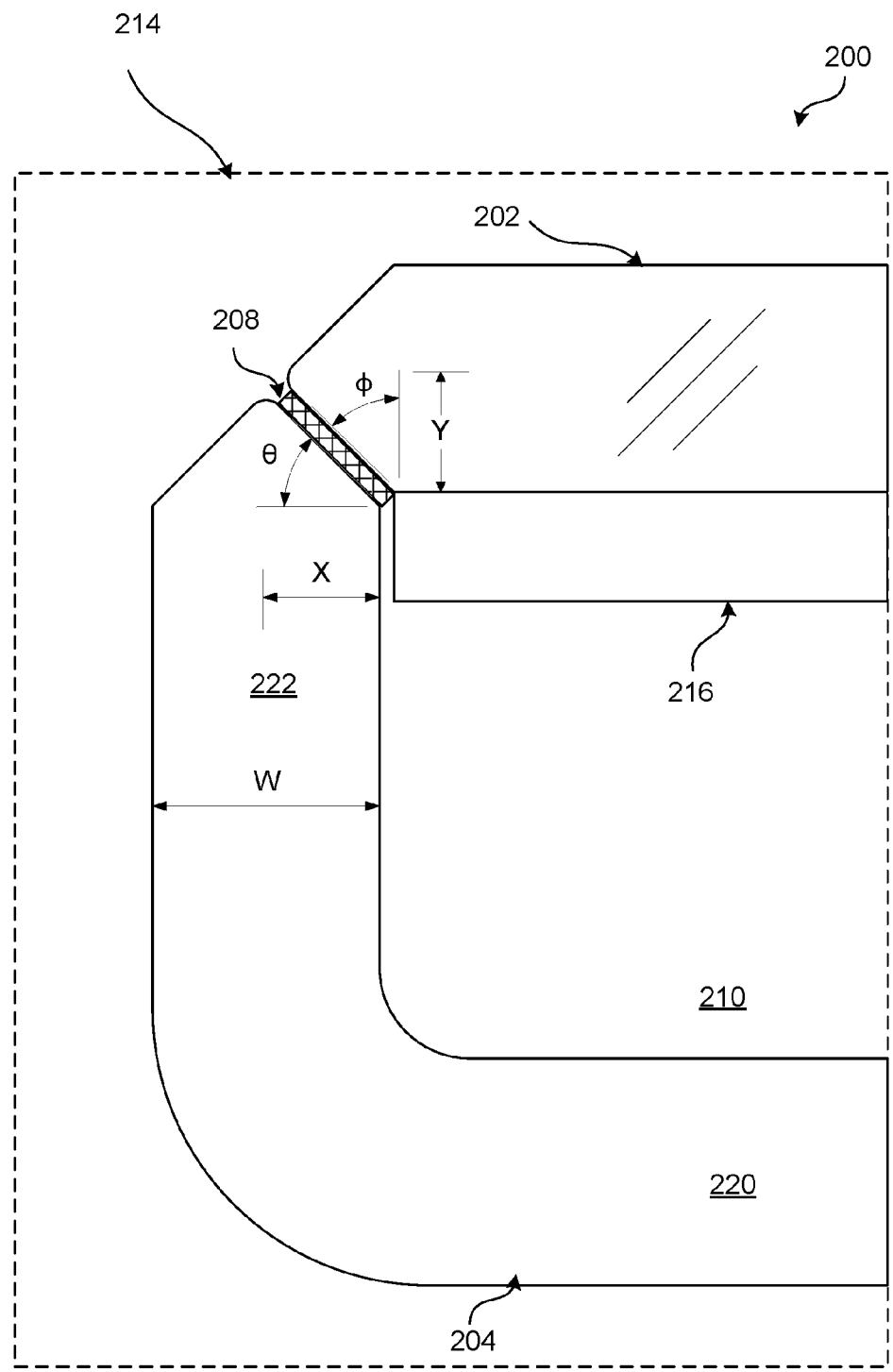
FIG. 2D is a detail of the cross section shown in FIG. 2C.

FIGS. 2A-2D illustrate an example technique for mounting a display or display cover to a display device housing using chamfered edges, according to some embodiments. FIG. 2A shows a top view of example display device 200 that includes a display cover 202 mounted to a housing 204 using chamfered edges. Again, the term "display device" can include any device that includes a display, for example a mobile phone, tablet device, laptop computer, computer monitor, television, etc. FIG. 2B shows a cross section view of the display device 200 shown in FIG. 2A as indicated by the cross section arrows labeled 2B. FIG. 2C is a first detail of the cross section shown in FIG. 2B as indicated by the dotted line box 212 and FIG. 2D is a second detail of the cross section shown in FIG. 2C as indicated by the dotted line box 214.

As shown in FIG. 2C, display device 200 can include a housing 204 with a display cover 204 attached at chamfered edges using a layer of bonding material 208. As used herein, the term "housing" can refer to the structural body or "chassis" of display device 200 that includes, for example walls surrounding an interior space 210 of display device 200. In some embodiments housing 204 can be configured as a single piece seamless housing that can be formed of any number of materials such as plastic or metal which can be forged, molded, or otherwise processed into a desired shape. In some embodiments housing 204 may be formed of several structural components configured and fastened together to form the desired shape. In embodiments where display device 200 has a metal housing 204 and incorporates RF based functionality, it may be advantageous to provide at least a portion of housing 204 in the form of an RF transparent material such as ceramic, or plastic. In any case, housing 204 can be configured to at least partially enclose in the interior space 210 any suitable number of internal components associated with the functionality of display device 200. For example, housing 204 can enclose and support internally various structural and electrical components of a computing system capable of performing computing operations necessary for the functionality of display device 200. An example system 700 of components that may be contained within housing 204 is described in more detail with respect to FIG. 7.

Housing 204 can include a front opening for placing internal components and may be sized to accommodate a display assembly 216 or any other system components configured for providing a visual display to a user of display device 200. Generally, housing 204 can include a bottom wall 220 and a plurality of side walls 222 that, along with the bottom wall 220, form the interior space 210 of the housing 204. Here, the front opening is defined by a top edge of the side walls 222 of housing 204. For example, as shown in FIGS. 2C and 2D, the top edge of side walls 222 include a chamfer with an angled surface configured to meet an angled surface of a chamfered edge of display cover 202. Note that while side wall 222 and bottom wall 220 are called out with separate references in FIGS. 2C and 2D they may be part of a single structural piece or may be constructed of two or more structural pieces.

Display cover 202 can be formed of a panel of transparent material (including near transparent material). For example, display cover 202 may be composed of glass, plastic, any other suitable transparent material (e.g., crystallized aluminum oxide), or any combination thereof. When affixed to housing 204, display cover 202 may cover the front opening of housing 204 thereby enclosing interior space 210. As shown in FIGS. 2C and 2D, the panel of transparent material forming display cover 202 may include a chamfered edge with an angled surface configured to meet an angled surface of the chamfered edge of the side walls 222 of housing 204.

An active display assembly 216 may be arranged within the interior space of housing 204 and oriented so as to be viewable through the display cover 202 covering the front opening of housing 204. Active display assembly 216 can be configured to display generated images using any suitable display technology, such as LCD, LED, OLED, electronic or e-inks, etc. Display assembly 216 may be placed and secured within the interior space 210 using a variety of mechanisms. In one embodiment, the display assembly 216 is snapped into the cavity. Alternatively, and as shown in FIGS. 2C-2D, display assembly 216 may be affixed to a bottom surface of display cover 202 before display cover 202 is affixed to the housing 204. In some embodiments, display assembly be placed flush with the side walls 222 of housing 204 so as to provide the maximum viewing area to a user of display device 200. The display assembly 216 can also provide a user with tactile feedback provided by a number of haptic actuators usually, but not always, arranged in an array of haptic actuators incorporated into the display. In this way, the haptic actuators can provide the user with tactile feedback. An example display assembly 216 in the form of a touch screen display assembly is described in more detail with respect to FIG. 5.

Returning to FIG. 2D, as previously explained display cover 202 may include a chamfer that is defined by a depth Y measured perpendicular from a bottom surface of the display cover 202 and an angle $\phi$ measured relative to the bottom surface of the display cover 202. Similarly the side wall 222 of housing 204 may at a tope edge include a chamfer defined by a depth X measured perpendicular from an inside surface of the side wall 222 of housing 204 and an angle $\theta$ measured relative to the inside surface of the side wall 222 of housing 204. The chamfered edges of the display cover 202 and housing 204 may form angled mounting surfaces, which as shown in FIG. 2D, are in some embodiments, substantially parallel. For example, in such embodiments, the angle φ of the chamfered edge of the display cover 202 complements the angle θ of the chamfered edge of the sidewall 222 of housing 204 such that display cover 202 is affixed to the side wall 222 of the housing 204 at substantially a 90 degree angle. For example, in some embodiments both φ and θ are 45 degrees. In other embodiments either of angles φ or θ can be between 30 and 60 degrees. However, it shall be appreciated, that these mounting surfaces need not be parallel. In some embodiments (not shown), angles θ and φ may be configured such that the space between display cover 202 and housing 204 increases or decreases towards the outer edge of display device 200.

According to some embodiments, the layer of bonding material 208 used to affix display cover 202 to housing 204 is a curable liquid adhesive, for example a glue. The type of bonding material 208 will depend on the materials used for the display cover 202 and housing 204, but can include, for example, polyvinyl acetate (PVA), epoxy, silicone, UV-curable acrylics, polyurethane, etc. In a preferred embodiment, the bonding material 208 is air curable at room temperature, although in alternative embodiments, bonding material 208 may be cured through the application of ultraviolet (UV) light, thermal energy, moisture, or some other catalyst. In some embodiments, bonding material 208 is made of a re-workable adhesive. In other words, during manufacture bonding material 208 can be easily removed after application, if needed, then reapplied.

The components of display device 200 are shown in FIGS. 2A-2D in a conceptual and exaggerated form for illustrative purposes and are not to be construed as limiting to a particular shape or set of dimensions. The thickness W of housing 204 will vary depending on a number of factors such as the type of material used, the method of manufacture, and the application requirements. For example, where display device 200 is implemented as a mobile phone with a unitary metal housing 204, the wall thickness W of housing 204 can be approximately 0.8 to 1.0 mm. Similarly the dimensions X and Y of the chamfers at the edge of the side wall 222 of housing 204 and display cover 202 (respectively) will vary depending on a number of factors such as the types of materials used, the types of bonding material 208 used, the methods of manufacture, the angles φ and θ of the chamfers and the application requirements. In an embodiment in which display device 200 is implemented as a mobile phone, chamfer dimensions X, Y, φ, θ, may be configured to provide a sufficient contact area between the display cover 202 and housing 204 needed for the layer of bonding material 208 to hold the display cover 202 securely in place in place. For example, if bonding material 208 is a standard air curable glue, and both chamfers are at a 45 degree angle, sizing dimensions X and Y to be at least 0.1 mm should be sufficient to effectively secure a glass display cover 202 to housing 204. Again, the actual dimensions for a given embodiment will depend on one or more the aforementioned factors.

In some embodiments the display cover 202 and top edge of the side wall 222 of housing 204 can include a double chamfer, for example as shown in FIGS. 2C-2D. Here the double chamfered edges create an angled exterior surface of display device 200 where the two components 202 and 204 meet. This angled surface can be provided for aesthetic, structural integrity, and/or ergonomic purposes, for example to avoid a square (i.e. sharp) exterior edge where components 202 and 204 meet. Alternatively, the exterior edge at the intersection of components 202 and 204 can include a rounded chamfer (i.e. fillet) (not shown).

Figure 3A:
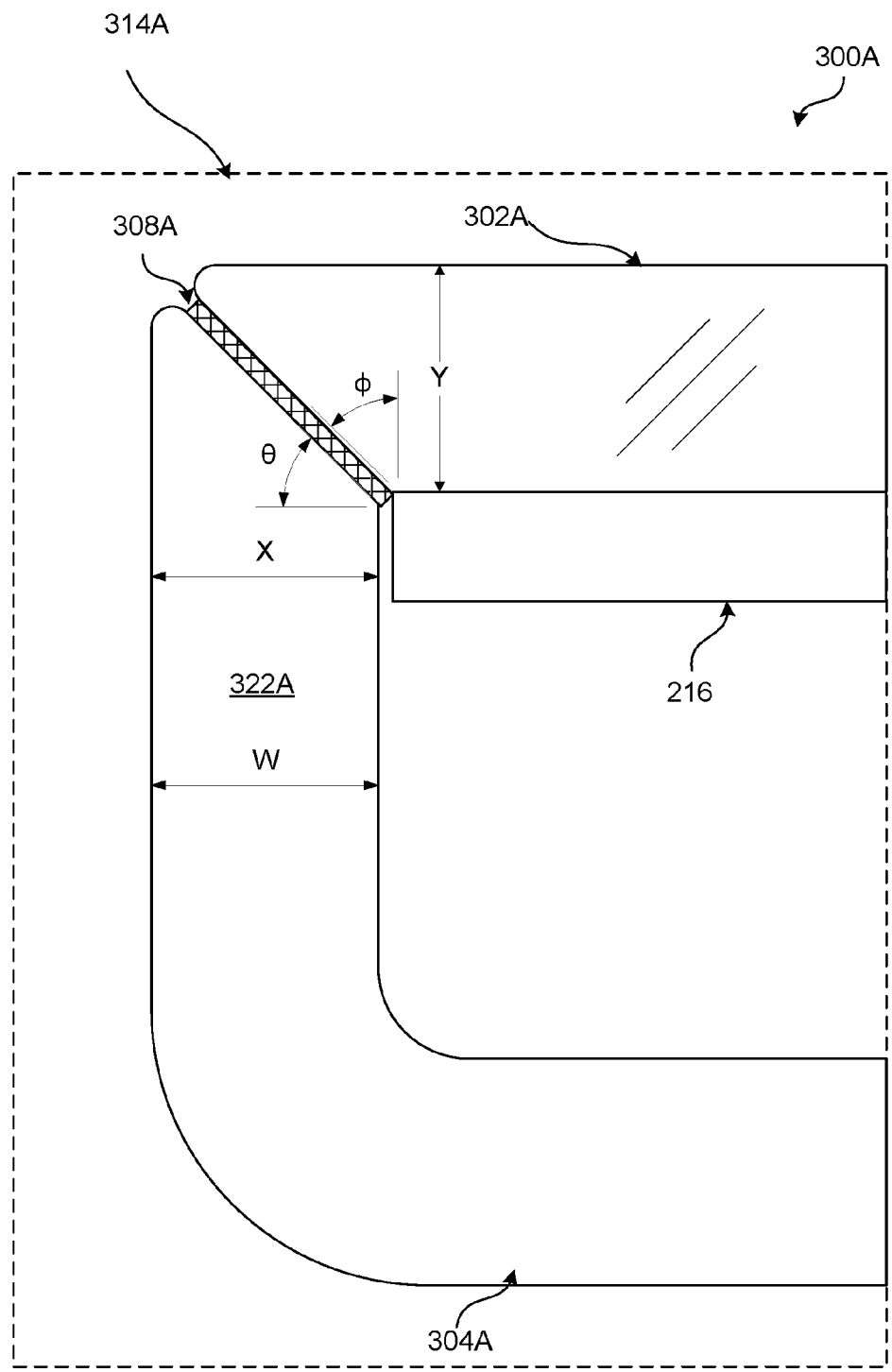
FIG. 3A shows a detail of a cross section of a first alternative embodiment of a display device similar to the display device of FIG. 2A.

As mentioned, the exterior chamfers (or fillets) of display cover 202 and housing 204 may be provided for aesthetic, structural, and/or ergonomic purposes, but are otherwise not required to mount the display cover 202 to housing 204. For example, FIG. 3A shows a detail 314A of a cross section of a display device 300A that is otherwise the same as display device 200 of FIGS. 2A-2D, except that it includes a display cover 302A affixed to a top edge of a side wall 322A to form a roughly square exterior edge. Similar to as shown in FIG. 2D, display cover 302 may include a chamfer that is defined by a depth Y measured perpendicular from a bottom surface of the display cover 302A and an angle φ measured relative to the bottom surface of the display cover 302A. Similarly the side wall 322A of housing 304A may at a top edge include a chamfer defined by a depth X measured perpendicular from an inside surface of the side wall 322A of housing 304A and an angle θ measured relative to the inside surface of the side wall 322A of housing 304A. Here, the thickness W of side wall 322A is roughly equivalent to the depth X of the chamfer. Such a chamfer that creates a single angled surface transition between the opposing inner and outer surfaces of side wall 322A can sometimes be referred to as a "bevel," but the terms, as used herein, are interchangeable.

Figure 3B:
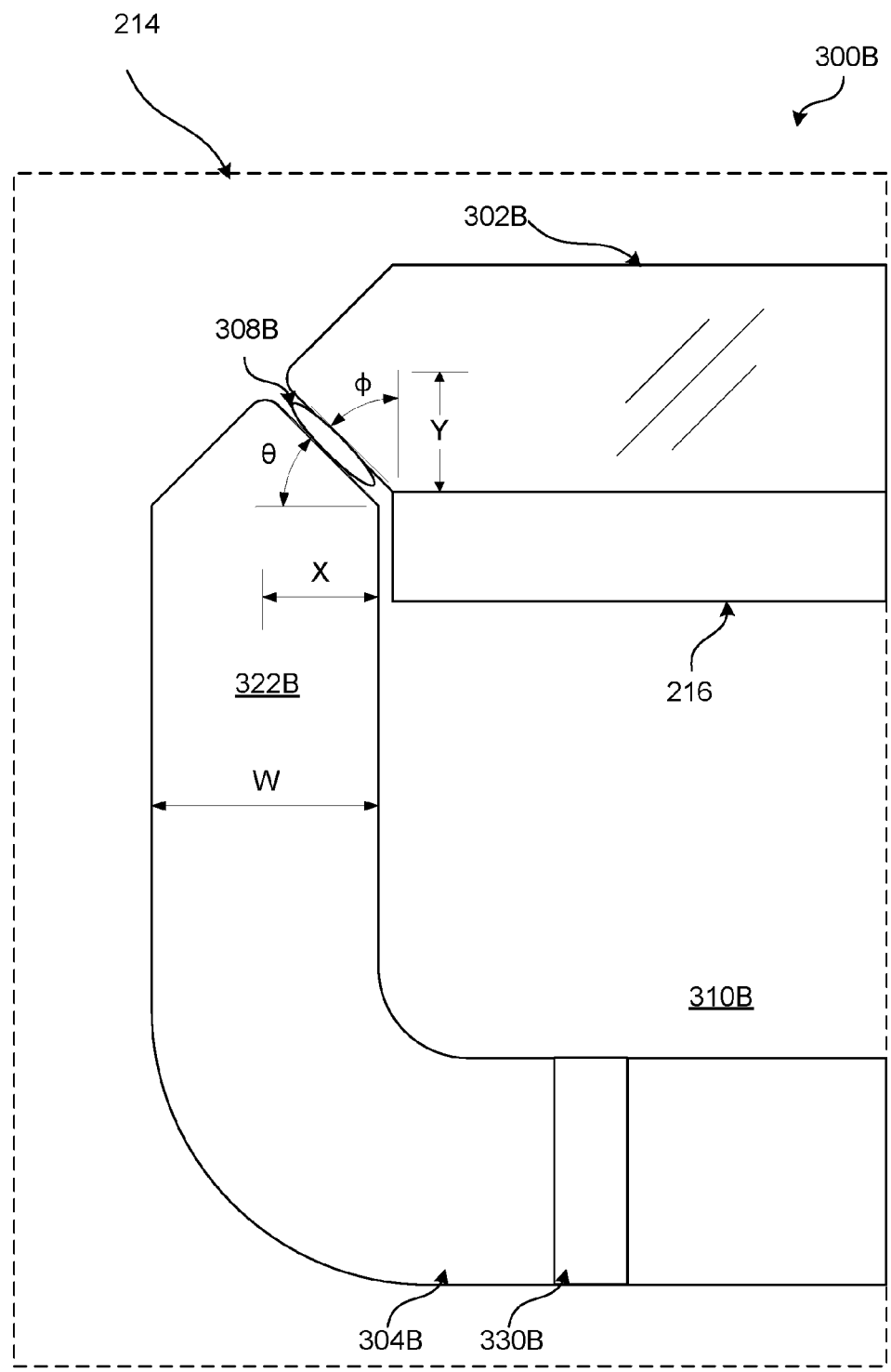
FIG. 3B shows a detail of a cross section of a second alternative embodiment of a display device similar to the display device of FIG. 2A.

In some embodiments, the layer of bonding material 208 may not be necessary between the surfaces of the chamfered edges of display cover 202 and housing 204. For example, FIG. 3B shows a detail 314B of a cross section of a display device 300B that is otherwise the same as display device 200 of FIGS. 2A-2D, except that instead of a layer of bonding material it includes a gasket 308B of some type and uses the application of a vacuum within an interior space 310B of the housing 304B to affix the display cover 302B to the housing 304B. Similar to as shown in FIG. 2D, display cover 302B may include a chamfer that is defined by a depth Y measured perpendicular from a bottom surface of the display cover 302B and an angle φ measured relative to the bottom surface of the display cover 302B. Similarly the side wall 322B of housing 304B may at a top edge include a chamfer defined by a depth X measured perpendicular from an inside surface of the side wall 322B of housing 304B and an angle θ measured relative to the inside surface of the side wall 322B of housing 304B. The chamfered edges of the display cover 302B and housing 304B may form angled mounting surfaces, which as shown in FIG. 3B, are in some embodiments, substantially parallel. However, it shall be appreciated, that these mounting surfaces need not be parallel. In some embodiments, angles θ and φ may be configured such that the space between display cover 302B and housing 304B increases or decreases towards the outer edge of display device 300B.

As mentioned, instead of a layer of bonding material, display device 300B may include a gasket 308 or some other means of providing an air tight seal between the mounting surfaces of the chamfered edges of display cover 302B and housing 304B. Gasket 308B may include one or more rings of material (e.g. rubber, plastic, etc.) that can be placed on the contacting surfaces of display cover 302B and housing 304B. To affix display cover 302B to housing 304B without an adhesive material, the air may be pulled form within interior space 310B, for example, via a valve 330B in a wall of housing 304B or a valve in display cover 302B (not shown), thereby creating a vacuum within interior space 310B. As a result of the vacuum created within interior space 310B, the display cover 302B is held in place with respect to housing 304B due to the exterior air pressure.

Figure 4A:
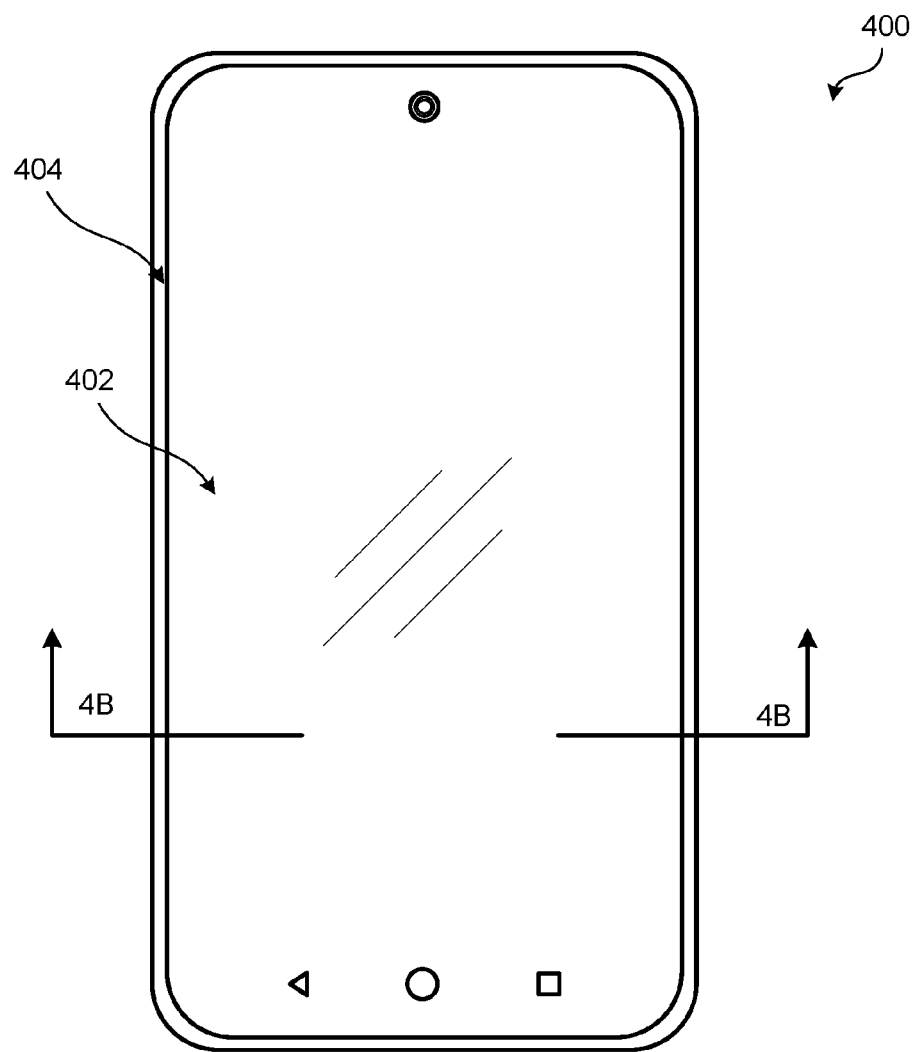
FIG. 4A shows a top view of example display device that includes two display covers mounted to a housing using chamfered edges.
Figure 4B:
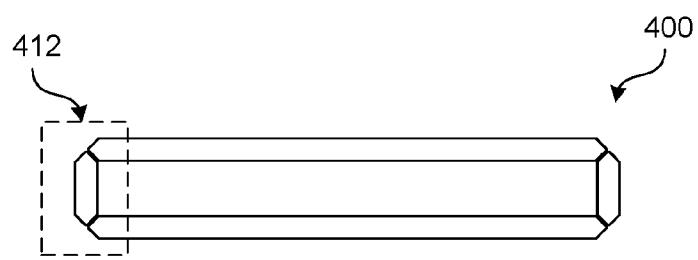
FIG. 4B shows a cross section view of the display device of FIG. 4A.
Figure 4C:
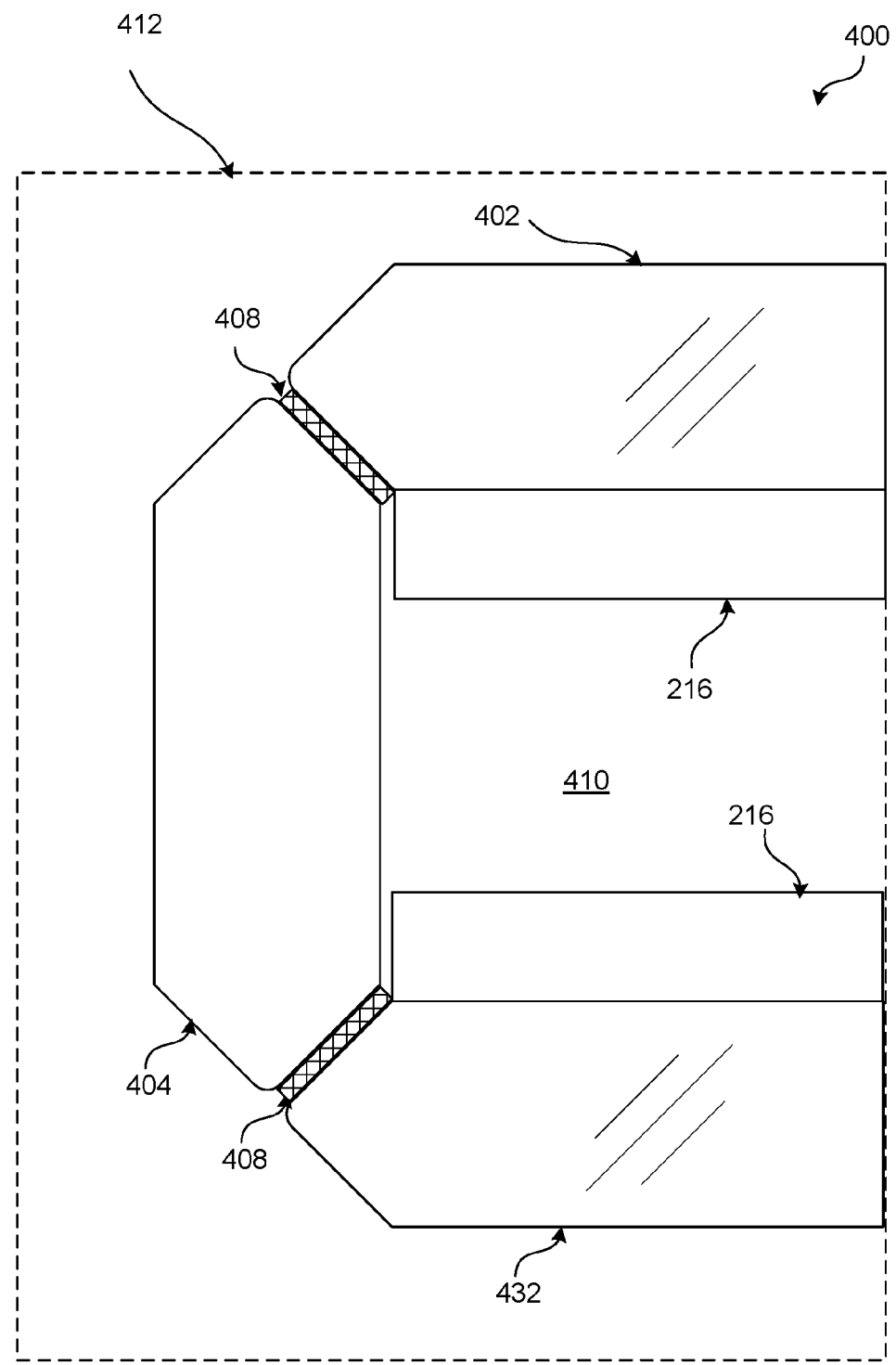
FIG. 4C is a detail of the cross section shown in FIG. 4B.

The concept of mounting the display cover to a housing using chamfered edges as described with respect to FIGS. 2A-3 can also be applied to a display device with two displays on opposite sides. FIGS. 4A-4C illustrate an example technique for mounting multiple displays or display covers to opposite sides of a display device housing using chamfered edges, according to some embodiments. FIG. 4A shows a top view of example display device 400 that includes two display covers 402 (only one shown) mounted to a housing 404 using chamfered edges. Again, the term "display device" can include any device that includes a display, for example a mobile phone, tablet device, laptop computer, computer monitor, television, etc. FIG. 4B shows a cross section view of the display device 400 shown in FIG. 4A as indicated by the cross section arrows labeled 4B. FIG. 4C is a detail of the cross section shown in FIG. 4B as indicated by the dotted line box 412.

As shown in FIG. 4C, display device 400 can include a housing 404 that acts as a side wall with a display cover 404 attached at a chamfered edge using a layer of bonding material 408 at a top edge of housing 404 and a second display cover 432 attached at chamfered edge using a layer of bonding material 408 at a bottom edge of housing 404. Here the bottom wall 220 of housing 204 described with respect to FIGS. 2C-2D is replaced with the second display cover 432 that covers a back opening of housing 404, thereby enclosing interior space 410. The back opening can be defined by the bottom edge of the side wall of housing 404. The front and back openings of housing 404 can be sized to accommodate one or more display assemblies 216. For example, as shown in FIG. 4C, display device 400 includes a first display assembly affixed to the bottom surface of first display cover 402 and a second display assembly 216 affixed to a top surface of second display cover 432, both arranged so as to be viewable by a user of device 400.

The components of example display devices 200, 300, and 400 have been shown in FIGS. 2A-4C in a simplified form to illustrate the concept of mounting a display cover at a chamfered edge. In practice, a display device may include more or fewer components while remaining within the scope of the innovation. For example, a housing of a display device may include additional mounting features (e.g. clips, grooves, frames, shims, sealants, etc.) that have not been shown in the illustrated example embodiments.

Example Display Components

Figure 5:
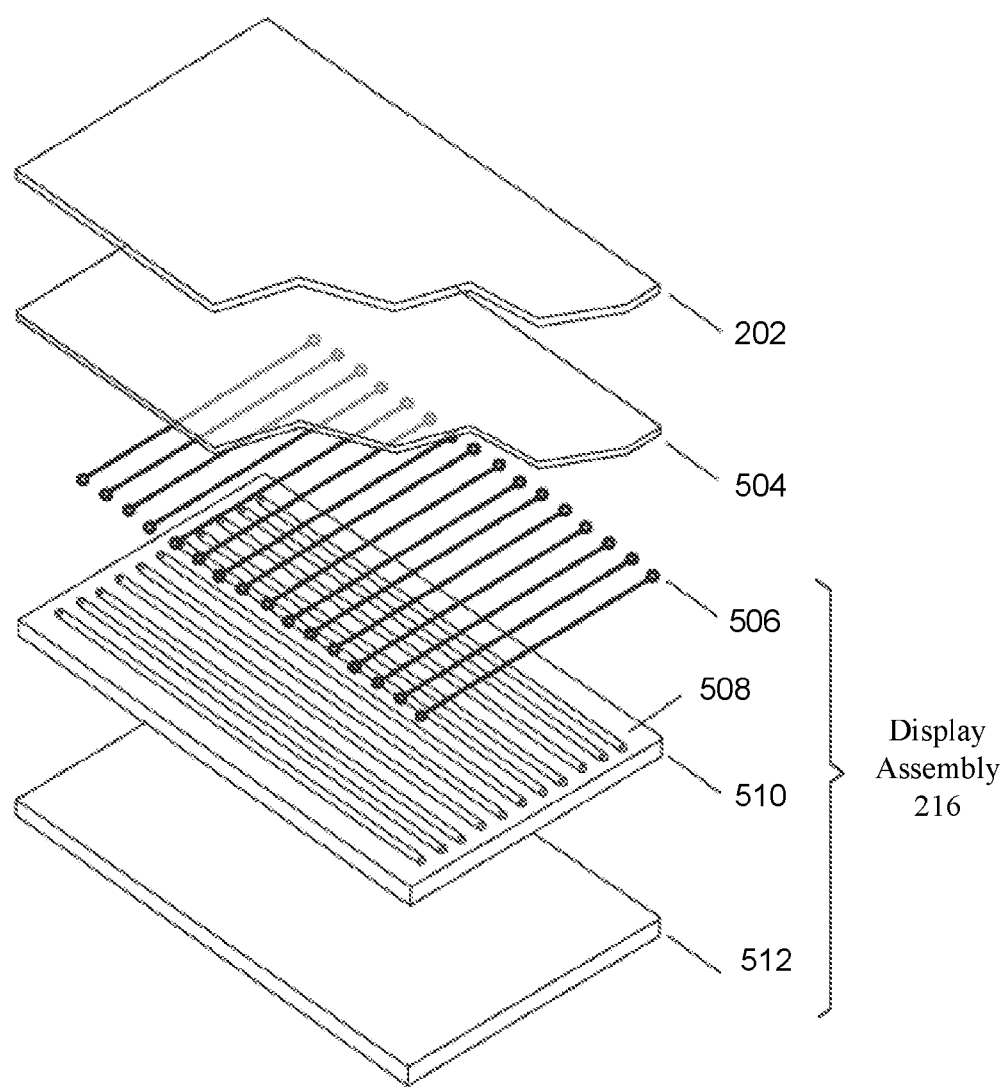
FIG. 5 is an exploded perspective view of an example display assembly configured for use as a touch screen display that can be used with a display device.

FIG. 5 is an exploded perspective view of an example display assembly 216 configured for use as a touch screen display that can be used with a display device similar to display device 200. The display assembly 216 can include driving lines 506 and sensing lines 508 disposed on a mounting substrate 510, and an active display layer 512. In some embodiments the components of display assembly 216 are affixed display cover 202 using an optically-clear bonding layer 504. Various embodiments can include some or all of these layers, as well as other layers.

The display cover 202 (previously described) can, in the context of a touch screen display, enable a user to interact with (e.g., by making contact with an outer surface using a finger) the display assembly 216. A previously mentioned, display cover 502 is preferably substantially or entirely transparent and can be composed of glass, plastic, any other suitably transparent material (e.g., crystallized aluminum oxide), or any combination thereof.

Together, the driving lines 206 and sensing lines 508 include multiple electrodes ("nodes") that create a coordinate grid for the display assembly 516. The coordinate grid may be used by a processor (e.g. processor X described with respect to FIG. X) to determine the intent of a user interaction with display cover 202. The driving lines 506 and/or sensing lines 508 can be mounted to or embedded within a transparent substrate 510, such as glass or plastic. The driving lines 506, sensing lines 508, and/or mounting substrate 510 can be collectively referred to as "touch circuitry."

An optically-clear bonding layer 504 may be used to bind the display cover 202 to one or more of the components of display assembly 216. Where implemented as a touch screen, he optically-clear bonding layer 504 may be conductive so as to generate signals responsive to user interaction with the display cover 202. The bonding layer 504 can include an acrylic-based or silicon-based adhesive, as well as one or more layers of indium-tin-oxide (ITO). Moreover, the bonding layer 504 is preferably substantially or entirely transparent (e.g., greater than 99% light transmission) and may display good adhesion to a variety of substrates, including glass, polyethylene (PET), polycarbonate (PC), polymethyl methacrylate (PMMA), etc.

A active display layer 512 is configured to display content with which the user may be able to interact. The active display layer 512 can include, for example, a liquid crystal display (LCD) panel with a backlight assembly (e.g., including a diffuser and backlight)(not shown) that is able to illuminate the LCD panel. Other display technologies can also be used, such as light emitting diodes (LEDs), organic light emitting diodes (OLED), electrophoretic/electronic ink ("e-ink"), etc. In some embodiments, air gaps may be present between or within some of these layers. For example, an air gap may be present between a diffuser and a backlight in the backlight assembly.

Example Processing System

Figure 6:
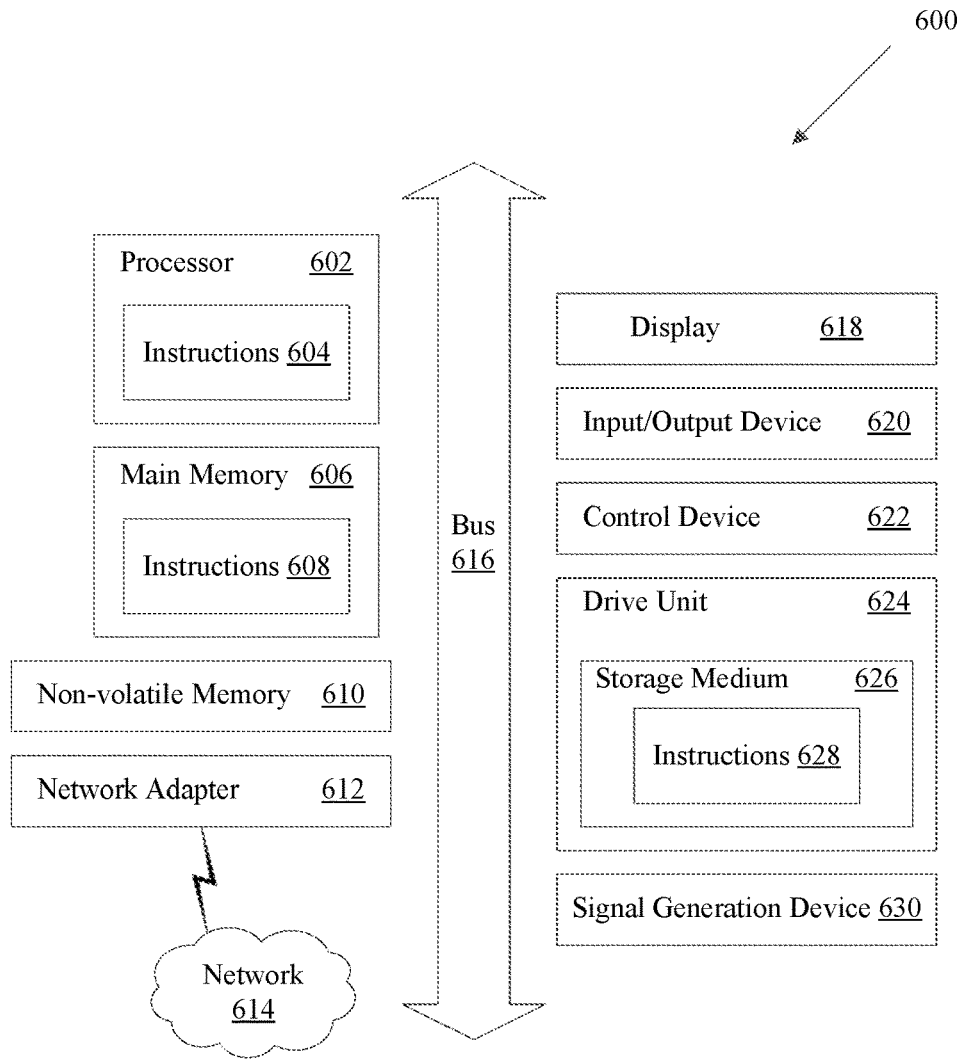
FIG. 6 is a block diagram illustrating an example processing system that may be part of a display device.

FIG. 6 is a block diagram illustrating an example of a processing system 600 that may be part of the previously described display device 200. The processing system 600 may include one or more central processing units ("processors") 602, main memory 606, non-volatile memory 610, network adapter 612 (e.g., network interfaces), a display 618 (e.g. as part of display assembly 216), input/output devices 620, control device 622 (e.g., keyboard and pointing devices), drive unit 624 including a storage medium 626, and signal generation device 630 that are communicatively connected to a bus 616. The bus 616 is illustrated as an abstraction that represents any one or more separate physical buses, point to point connections, or both connected by appropriate bridges, adapters, or controllers. The bus 616, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 600 operates as part of a user device (e.g., display device 200 of FIGS. 2A-2D). For example, in some embodiments one or more of the described components of processing system 600 may be arranged within the interior space 210 of display device 200. In some embodiments, one or more of the components of processing system 600 may be external to and connected (e.g., wired or wirelessly) to the display device 200.

While the main memory 606, non-volatile memory 610, and storage medium 626 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 628. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement embodiments of the disclosure (e.g. input recognition for a touch screen display), may be implemented as part of an operating system or a specific application, component, program, object, module or sequence of instructions referred to as "computer programs." The computer programs typically comprise one or more instructions (e.g., instructions 604, 608, and 628) set at various times in various memory and storage devices in a computer, and that, when read and executed by one or more processing units or processors 602, cause the processing system 600 to perform certain operations.

Further examples of machine-readable storage media, machine-readable media, or computer-readable (storage) media include, but are not limited to, recordable type media such as volatile and non-volatile memory devices 610, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 612 enables the processing system 600 to mediate data in a network 614 with an entity that is external to the processing system 600 through any known and/or convenient communications protocol supported by the processing system 600 and the external entity. The network adapter 612 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

Manufacturing Methods

Figure 7:
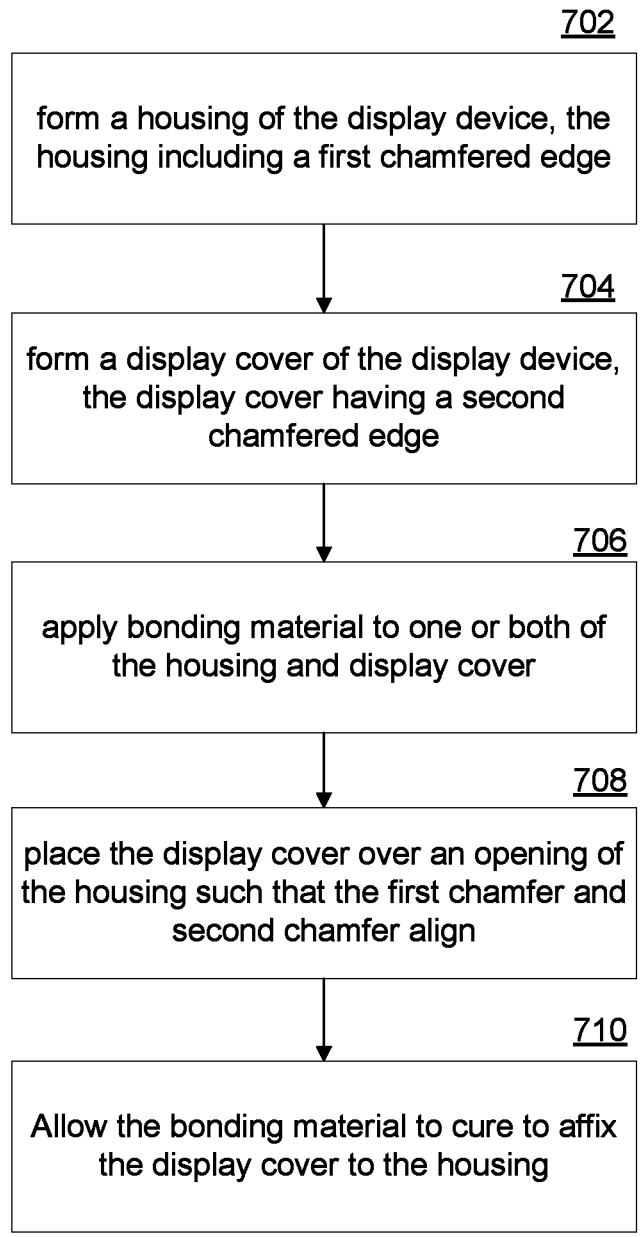
FIG. 7 is a flow diagram of an example process for manufacturing a display device using chamfered edges.

FIG. 7 is a flow diagram of an example process 700 for manufacturing a display device. For clarity, process 700 is described in the context of manufacturing display device 200 described with respect to FIGS. 2A-2D, but can also be applied to the manufacture of alternative embodiments.

Process 700 begins at step 702 with forming a hosing 204 for display device 200. As previously discussed, housing 204 can include a bottom wall and a plurality of side walls that, along with the bottom wall, form an interior space of the housing with a front opening, the front opening defined by a top edge of the side walls, the top edge of the side walls having a first chamfer. In some embodiments housing 204 can formed of a single piece of any type of material suitable to provide a supportive housing, such a metal or plastic. A unitary housing 204 can be forged, molded, machined, or otherwise processed into a desired shape. Alternatively, in some embodiments housing 204 may be formed of several prefabricated structural components configured and fastened together to form the desired shape.

In an embodiment, housing 204 is formed of a metal or metal alloy (e.g. a titanium/copper alloy) using a metal injection molding (MIM) process. In some embodiments the MIM process includes first mixing and granulating a MIM composition of the desired metal or metal alloy with a binding material (e.g. a polymer). This MIM composition is then heated and injected into a mold under high pressure to form what is called a "green" mold of the housing. The mold includes a cavity in a shape of the "green" mold which corresponds to a near-net shape of the final desired housing. After injecting the MIM composition to form the "green" housing and allowing to cool, a debinding process is applied to remove binding material from the green housing, thereby forming what is referred to as a "brown" mold of the housing. Depending on the type of binding material used, the debinding process can application of thermal energy to melt the binding material, and/or submerging the green housing in a chemical solvent of some type to dissolve the binding material. The resulting brown housing contains cavities or pores where the binder previously occupied space. In some embodiments, these cavities may be infused with another metal such as copper to provide additional thermal conductivity. In some embodiments, the brown housing is first sintered and then infused with the other material (e.g. copper). Alternatively, the brown housing can first be infused with the other material and then sintered to remove any remaining binder. The resulting part following sintering and/or infusing of the brown housing is housing 204.

In some embodiments, the chamfer on the top edge of the side wall 222 of housing 204 may be formed as part of the original shape of housing 204, for example through a machining or molding process. Alternatively if the chamfer can be applied to the top edge of the housing during a post process (e.g. a machining or grinding process).

Process 700 continues at step 704 with forming the display cover 202. As previously described, display cover 202 may be formed of a panel of transparent material (including near transparent material). For example, display cover 202 may be composed of glass, plastic, any other suitable transparent material (e.g., crystallized aluminum oxide), or any combination thereof. In an embodiment, forming the display cover 202 includes cutting a shape of the display cover 202 from a plate of the transparent material (e.g. using a precision automated glass cutting machine), and machining an edge of the resulting shape to form a chamfered edge. Alternatively, depending on the transparent material used, display cover 202 along with the chamfered edge may be formed, for example, through an injection molding process.

Process 700 continues at step 706 with applying a bonding material 208 to the angled surfaces of the chamfered edges of the display cover 202 and/or the housing 204. As previously described, bonding material 208 may be a curable liquid adhesive, for example a glue. In some embodiments, particularly where relatively high precision is required, bonding material may be applied to the angled surfaces of the chamfered edges of the display cover 202 and/or the housing using a precision automated glue applicator. For example, Nordsen manufactures precision 3 and 4 axis automated glue applicators. A previously described, the type of bonding material 208 used will depend on the materials used for the display cover 202 and housing 204, but can include, for example, polyvinyl acetate (PVA), epoxy, silicone, UV-curable acrylics, polyurethane, etc. In some embodiments, step 706 includes, prior to applying the bonding material, cleaning the angled surfaces of the chamfered edges of the display cover 202 and/or the housing 204 with a solvent to remove any foreign material that may negatively impact the strength of the bond formed by the layer of bonding material 208.

In some embodiments, bonding material 208 is made of a re-workable adhesive. In such embodiments, step 706 may include inspecting the applied bonding material 208 to determine if it was effectively applied, removing the bonding material 208 if it is determining that the application is deficient, and re applying the bonding material 208. This process of inspecting the applied bonding material may, in some embodiments, be performed by a human. Alternatively, the inspection process may be performed as part of an automated quality assurance process, for example aided by optical sensors.

Process 700 continues at step 708 with placing the display cover 202 over the front opening of housing 204 such that the chamfer of the top edge of the side walls of the housing 204 aligns with the chamfer of the display cover 202 and the bonding material 208 contacts the angled surfaces of both chamfered edges. In some embodiments this step can simply be performed by a human during an assembly process. Alternatively, the display cover 202 can be put in placed onto housing 204 using a precision robotic device. Since display cover 202, once affixed to housing 204 encloses or at least substantially encloses interior space 201, it is assumed that prior to step 708, any other components of display device 200 (e.g. display assembly 216 and/or components of system 600) are arranged within housing 204. In some embodiments, display assembly 216 (or at least one or more components of display assembly 216) are affixed (e.g. using bonding layer 504) to a bottom surface of the display cover 202 before placing the display cover 202 over the front opening of the housing 204.

Process 700 concludes at step 710 with allowing the bonding material 208 to cure such that the display cover 202 affixes to the housing 204 thereby enclosing the interior space of the housing 204. In a preferred embodiment, where bonding material 208 is air curable at room temperature, step 710 may simply involve allowing the assembled display device 200 to rest while the bonding material cures. Alternatively, depending on the type of bonding material used, step 710 may involve actively performing a curing process, for example, through the application of ultraviolet (UV) light, thermal energy, moisture, or some other catalyst.

The previously described process is an example process for manufacturing a display device, according to some embodiments. In practice, this process may include fewer or more steps and may reorder certain steps while remaining within the scope of the present innovation.

Remarks

The foregoing description of various embodiments has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

What is claimed is:

1. A display device comprising:
   a housing including:
      a bottom wall; and
      a plurality of side walls that, along with the bottom wall, form an interior space of the housing with a front opening, the front opening defined by a top edge of the side walls, the top edge of the side walls having a first chamfer; and
   a display cover including a panel of transparent material with edges having a second chamfer, the second chamfer of the display cover aligned with the first chamfer of the top edge of the side walls of the housing so as to enclose the interior space of the housing, the display cover affixed to the housing through the introduction of a vacuum within the interior space of the housing; and
   an active display assembly arranged within the interior space of the housing and oriented so as to be viewable through the front opening, while in use.

2. The display device of claim 1, wherein the second chamfer is defined by a depth Y measured perpendicular from a bottom surface of the display cover and an angle φ measured relative to the bottom surface of the display cover.

3. The display device of claim 2, wherein the angle φ of the second chamfer is between 30 (thirty) and 60 (sixty) degrees.

4. The display device of claim 2, wherein the angle φ of the second chamfer complements an angle θ of the first chamfer such that display cover is affixed to the side wall of the housing at substantially a 90 (ninety) degree angle.

5. The display device of claim 1, wherein the display cover is further affixed to the housing by a bonding material between adjoining faces of the first chamfer of the top edge of the side walls and the second chamfer of the display cover.

6. The display device of claim 1, wherein the bonding material includes any of a re-workable adhesive or a curable liquid adhesive.

7. The display device of claim 1, wherein the transparent material of the display cover includes one or more of a glass, plastic, or crystalized aluminum oxide.

8. The display device of claim 1, wherein the housing is formed as a single piece of material.

9. The display device of claim 1, wherein the housing is formed through an injection molding process.

10. The display device of claim 1, wherein the side walls of the housing form a bezel around a viewable area of the active display assembly, and wherein the bezel is less than 1 (one) millimeter thick in at least some areas.

11. The display device of claim 1, wherein the active display assembly is configured for use as a touch screen display.

12. The display device of claim 1, wherein the display device is a mobile phone.

13. A method of manufacturing a display device, the method comprising:
forming a housing that includes a bottom wall and a plurality of side walls that, along with the bottom wall, form an interior space of the housing with a front opening, the front opening defined by a top edge of the side walls, the top edge of the side walls having a first chamfer;
forming a transparent display cover with edges having a second chamfer;
applying a first bonding material to a bottom surface of the transparent display cover;
affixing an active display assembly to the bottom surface of the transparent display cover using the first bonding material;
placing the transparent display cover and affixed active display assembly over the front opening such that the first chamfer of the top edge of the side walls of the housing align with the second chamfer of the transparent display cover thereby enclosing the interior space of the housing; and
applying a vacuum within the interior space of the housing so as to affix the transparent display cover to the housing.

14. The method of claim 13, further comprising:
applying a second bonding material along the first chamfer of the top edge of the side walls of the housing before placing the transparent display cover and affixed active display assembly over the front opening; and
allowing the second bonding material to cure so as to further affix the transparent display cover to the housing.

15. The method of claim 13, wherein forming the housing includes:
machining the housing from a single piece of material; or an injection molding process.

16. The method of claim 13, wherein forming the housing includes:
injecting a material composition into an injection mold to form a green housing, the injection mold including a cavity in a shape of the green housing, the shape of the green housing corresponding to a near-net shape of the housing, the material composition including a metal material and a binding material;
applying debinding process to remove binding material from the green housing, thereby forming a brown housing; and
sintering the brown housing to from the housing.

17. The method of claim 13, wherein forming the housing includes machining the top edge of the side walls to form the first chamfer.

18. The method of claim 13, wherein forming the transparent display cover includes:
cutting a shape of the transparent display cover from a plate of transparent material; and
machining an edge of the resulting shape to form the second chamfer.

19. The method of claim 14, wherein applying the first bonding material and/or the second bonding material is performed by an automated precision liquid adhesive applicator.

20. The method of claim 14, further comprising cleaning the first chamfer and the second chamfer with a solvent before applying the second bonding material.

21. A display device comprising:
a housing including:
a bottom wall; and
a plurality of side walls that, along with the bottom wall, form an interior space of the housing with a front opening, the front opening defined by a top edge of the side walls, the top edge of the side walls having a first chamfer creating an first angled mounting surface;
a display cover including a panel of transparent material with edges having a second chamfer, the second chamfer creating a second angled mounting surface, first and second angled mounting surfaces substantially in parallel and aligned such that the display cover encloses the interior space the housing; an active display assembly arranged within the interior space of the housing and affixed to a bottom surface of the display cover by a bonding material, the active display assembly oriented so as to be viewable through the front opening, while in use; and
a gasket between the first and second mounting surfaces, the gasket configured to provide an air tight seal between the first and second mounting surfaces;
wherein display cover is affixed to the housing through the introduction of a vacuum within the interior space of the housing.

* * * * *